United States Patent [19]

Bergkvist

[11] Patent Number: 5,036,306
[45] Date of Patent: Jul. 30, 1991

[54] PRESSURE RESPONSIVE POTENTIOMETER

[75] Inventor: Lars A. Bergkvist, Själevad, Sweden

[73] Assignee: Labino Patent AB, Sjalevad, Switzerland

[21] Appl. No.: 381,669

[22] PCT Filed: Nov. 10, 1988

[86] PCT No.: PCT/SE88/00604
§ 371 Date: Jul. 7, 1989
§ 102(e) Date: Jul. 7, 1989

[87] PCT Pub. No.: WO89/04953
PCT Pub. Date: Jun. 1, 1989

[30] Foreign Application Priority Data

Nov. 20, 1987 [SE] Sweden .................... 8704604

[51] Int. Cl.$^5$ ............................. H01C 10/10
[52] U.S. Cl. ................................. 338/114; 252/510; 73/862.64; 338/47
[58] Field of Search ............... 338/99, 114, 47; 252/510, 511; 73/862.64, 862.62

[56] References Cited

U.S. PATENT DOCUMENTS

| | | | |
|---|---|---|---|
| 3,875,434 | 4/1975 | Harden et al. | 338/114 X |
| 4,145,317 | 3/1979 | Sado et al. | 338/114 X |
| 4,163,204 | 7/1979 | Sado et al. | 338/114 |
| 4,273,682 | 6/1981 | Kanamori | 338/114 X |
| 4,322,983 | 4/1982 | Sado | 73/862.68 |
| 4,505,847 | 3/1985 | Jackson | 252/511 |
| 4,548,862 | 10/1985 | Hartman | 428/323 |
| 4,794,365 | 12/1988 | Dunbar | 338/99 |
| 4,845,457 | 7/1989 | Nakamishi | 338/114 |

FOREIGN PATENT DOCUMENTS

| | | |
|---|---|---|
| 2116935 | 11/1971 | Fed. Rep. of Germany. |
| 2240286 | 3/1974 | Fed. Rep. of Germany. |
| 456042 | 8/1988 | Sweden. |

Primary Examiner—Marvin M. Lateef
Attorney, Agent, or Firm—Nies, Kurz, Bergert & Tamburro

[57] ABSTRACT

A pressure responsive potentiometer, including an elastic body which includes a silicone mass mixed with a carbon fraction in a quantity such that the electrical resistance across the body is changed when a force is applied to the body, which body has electrically conductive contact tabs or plates or like elements connected thereto in mutually spaced relationship. The invention is characterized in that the body (1) is composed of a mixture including a silicone mass, silicone oil and carbon grains, where the weight ratio of silicone mass to silicone oil is about 1:0.3 to 1:0.5, preferably about 1:0.4, and where the carbon grains have a size which is greater than a size corresponding to a 50 mesh sieve (50 meshes per inch) and a size which is smaller than the smallest dimension of the body (1).

10 Claims, 1 Drawing Sheet

PRESSURE RESPONSIVE POTENTIOMETER

BACKGROUND OF THE INVENTION

The present invention relates to a pressure responsive potentiometer.

The present potentiometer has the property that the electrical resistance through the body of the potentiometer decreases when a pressure applied thereto increases.

One such pressure responsive potentiometer is described in Swedish Patent No. (patent application 8303840-6) Publication No. 456,042, dated Aug. 29, 1988. This patent specification describes a pressure responsive potentiometer embodiment in which the body is cylincrical and disc-shaped and comprises a mixture of a pastic substance and carbon powder. According to one specified embodiment, the body comprises 50% silicon mass and 50% carbon powder.

Corresponding bodies are also known from other patent specifications, of which the U.S. Pat. No. 4,273,682 is one.

The aforesaid Swedish patent specification mentions the use of carbon powder, such as pulverized graphite or pulversized black coal. The U.S. Pat. No. 4,273,682 also mentions carbon powder of fine fractions, i.e. of a size corresponding to Tyler's 80-mesh sieve, and still finer. An 80-mesh sieve is a sieve having 80 meshes per inch. Consequently, grains or particles capable of passing through the sieve have a diameter corresponding to one eightieth of an inch, i.e. approximately 0.3 mm.

The known technique thus teaches the use of carbon powder or very fine carbon grains. U.S. Pat. No. 4,273,682 recommends the use of screens of 80 mesh to 325 mesh, i.e. corresponding to a diameter from approximately 0.3 mm to 0.08 mm.

When using the device according to the aforesaid Swedish patent specification, it was found the reproducibility with regard to the resistance through the body against applied pressure was not acceptable. This problem was particularly manifest in applications where several of the devices were used and were each of said devices were intended to have the same or at least very similar properties.

In addition to the problem of reporducibility, it was found that the relationship between applied pressure and resistance through the body did not always follow an even and continuous relationship, but instead a relationship which varied greatly and at times discontinuously.

Subsequent to compreshensive inventive work and experiments, it has been possible to eliminate these undesirable properties.

SUMMARY OF THE INVENTION

A pressure responsive potentiometer according to the present invention exhibits a very high degree of reproducibility and also exhibits an even and continuous relationship between the applied pressure and resistance through the body, which makes the inventive potentiometer a particularly suitable component for controlling mutually different servo devices and the like for various types of machines.

The present invention is based, inter alia, on the concept that the carbon grains or particles must be considerably larger than previously proposed, while at the same time silicone oil must be added to the silicone mass.

Accordingly, the present invention relates to a pressure responsive potentiometer including an elastic body which comprises silicone mass mixed with a carbon fraction in a quantity such that the electrical resistance across the body will change in response to a force applied to said body, and which body has a plurality of electrically conductive metal contacts connected thereto in mutually spaced relationship, said potentiometer being characterized in that the body is composed of a mixture containing silicone mass, silicone oil and carbon grains, in which the weight ratio of silicone mass to silicone oil is about 1:0.4 to 1:0.5, preferably about 1:0.4, and where the carbon grains have a size which is greater than a size corresponding to a 50 mesh sieve (50 meshes per inch) and a size smaller than the smallest dimension of the body.

BRIEF DESCRIPTION OF THE DRAWINGS

The invention wil now be described in more detail with reference to exemplifying embodiments thereof illustrated in the accompanying drawing, in which.

DESCRIPTION OF THE PREFERRED EMBODIMENTS

Figure 1:
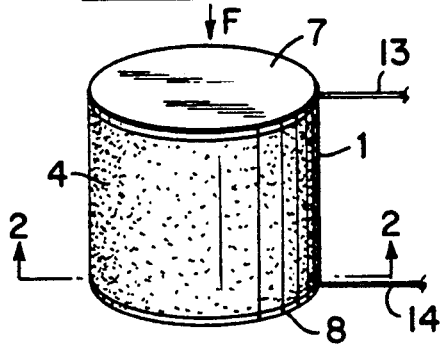
FIG. 1 is a view of a potentiometer constructed in accordance with a first embodiment.

FIGS. 1-6 illustrate different embodiments of a potentiometer 1,2,3 according to the invention.

All of the embodiments include an elastic body 4,5,6 which includes a silicone mass and a carbon fraction. Disposed in mutually spaced relationship on or in respective bodies 4,5,6 are electrically conductive contact tabs 7,8,9,10, 11,12 or like devices.

The contact tabs 7,8; 9,10; 11,12 are preferably made of brass, but may also be made of some other suitable material, such as copper, gold etc.

Furthermore, respective bodies 4,5,6 are constructed such that the body will be compressed when an external pressure P or force F is applied thereto.

Compression of the body results in a reduction in the electrical resistance through the body, i.e. between the electrical contact tabs 7,8; 9,10; 11,12. The resistance is changed significantly in dependence on the pressure applied.

The contact tabs are connected to electrical conductors, generally designated 13,14, via which the potentiometer is connected to an electric circuit. The circuit may be any kind of circuit whatsoever, adapted to the field of use or application concerned.

Figure 4:
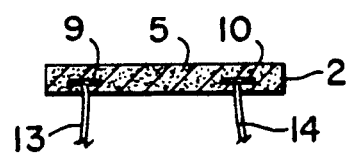
FIG. 4 is a sectional view taken on the plane 4—4 in FIG. 3.
Figure 6:
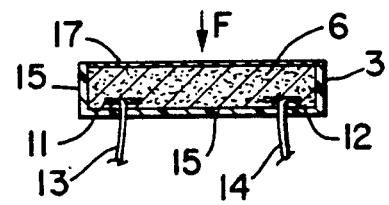
FIG. 6 is a sectional view taken on the plane 6—6 in FIG. 5.

In the case of the examples illustrated in FIG. 4 and FIG. 6, the contact tabs 9,10; 11,12 are embodied in the body.

Figure 2:
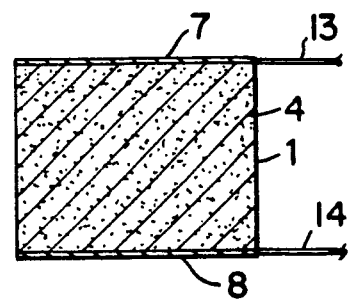
FIG. 2 is a sectional view taken on the plane 2—2 in FIG. 1.

In the case of the embodiment illustrated in FIG. 2, a contact tab 7,8 is connected to each of two mutually opposing sides of the body 4. The contacts will preferably cover substantially the whole of respective sides of the body 4. According to one preferred embodiment, the body is cylindrical.

Figure 3:
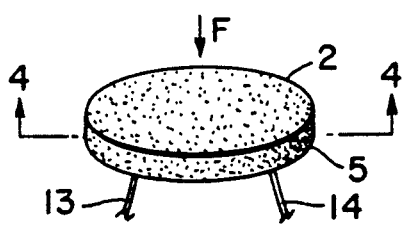
FIG. 3 is a view of a potentiometer constructed in accordance with a second embodiment.

The force F or the pressure is suitable applied to the larger surface of the body, as indicated in FIGS. 1, 3 and 6.

Figure 5:
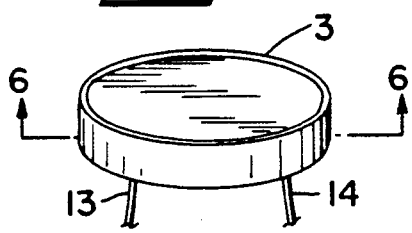
FIG. 5 is a view of a potentiometer constructed in accordance with a third embodiment.

In the case of the embodiment illustrated in FIG. 5 and FIG. 6, the body 6 is enclosed in a closed box 15,16. The box has at least one wall region 17 capable of transferring a pressure applied externally to the body 6.

Preferably, the box has the form of a round cup. The aforesaid wall region 17, which comprises a diaphragm, is located at one circular end surface. The contact tabs 11,12 are mounted on the inner surface ofa the opposite circular end surface 16 of the body 4.

The body is suitably made of plastic and the diaphragm suitably comprises a thin plastic, such as plastic foil.

It will be understood that the body may be given other geometrical shapes than the illustrated cylindrical shapes. For instance, the body may have a rectangular cross-section. Alternatively, the body may have a tiangular cross-section where contact plates are mounte on two sides of the triangle and the force is applied on the third side.

According to the present invention, the body 4,5,6 is produced from a mixture of silicone mass, silicone oil and carbon grains.

The weight ratio of silicone mass to silicone oil is about 1:0.3 to 1:0.5, preferably about 1:0.4.

The carbon grains have a size which is greater than a size corresponding to a 50 mesh sieve, i.e. a sieve having 50 meshes per inch, which corresponds to a diameter of 0.5 mm and a size which is smaller than the smallest dimension of the body.

According to one preferred embodiment, the carbon grains have a size which is smaller than a size corresponding to a 10 mesh sieve, i.e. corresponding to a diameter of 2.5 mm.

According to an especially preferred embodiment the carbon grains have a size corresponding to a size from a 28 mesh sieve to a 20 mesh sieve, i.e. corresponding to a diameter from 0.9 to 1.25 mm.

According to one preferred embodiment, the weight of carbon grains in the mixture is approximately equal to or greater than the weight of the silicone mass. A smaller amount of carbon results in poor reproducibility and greater resistance across the body, even in a loaded state.

A slightly larger amount of carbon, for instance an amount equal to from 1 to 1.5 times the weight of the silicone mass will result in a lower resistance across the body and a high reproducibility. Such a potentiometer is suitable for use for power control purposes when moderate powers are transferred through the body.

The carbon grains are thus much larger than the grains used in the known techniques disclosed in the introduction, which has been found to be one of the decisive factors for providing a pressure responsive potentiometer which exhibits a high degree of reproducibility and which also exhibits a uniform and continuous relationship between applied pressure and electrical resistance through the body.

The second of the decisive factors resides in the use of silicone oil. Although silicone oils of mutually different viscosities can be used, the silicone oil used in accordance with one preferred embodiment will have viscosity in the order of 200 centistokes.

The present invention is based on the understanding that when these carbon grains, which are relatively large in comparison with known techniques, are used in combination with a silicone mass to which silicone oil has been added, there is obtained a mixture of carbon grains, silicone mass and silicone oil which subsequent to being stirred or likewise agitated, molded and hardened will provide a body in which the carbon grains are distributed extremely uniformly throughout the body.

Studies have shown when moulding bodies in cylindrical cup-shaped moulds having a height of about 5 to 20 mm, that the silicone oil addition will cause any carbon grains which have collected in the lower part of the mould prior to the hardening process, to rise during the hardening process so as to obtain a uniform distribution of carbon grains throughout the mould.

A uniform distribution of carbon grains is particularly manifest when the vertical height extension of the body during manufacture, i.e. the vertical height extension of the mould, is from about 5 mm to about 20 mm. It has namely been observed that when the height of the body exceeds 20 mm, and particularly when the height of the body greatly exceeds 20 mm, for instance 40 mm, the carbon grains have a marked tendency to collect towards the lower part of the body.

A smaller body than 5 mm is unsuitable with regard to the size of the carbon grains. Reproducibility is lowered considerably at a height below 3–4 mm.

With respect to the size of the carbon grais, carbon which have a size greater than that corresponding to approximately 10 mesh will lie in direct contact with each other, without the presence of silicone therebetween. Although this provides relatively good reproducibility, the resistance across the body is relatively low, even when no load is applied, and consequently the use of such a potentiometer for control purposes is limited.

Carbon grains which have a size smaller than that corresponding to 50 mesh are dispersed uniformly in the mixture of silicone mass and silicone oil, but will give rise to an uneven and difficultly reproduced relationship between resistance and applied force. The reason why this relationship cannot be readily reproduced is not clear.

However, it has been established that when relatively large carbon grains are used, as before described, a minor quantity of fine-fraction carbon powder can be admixed with the larger carbon grains, without affecting the good reproducibility and the uniform relationship between resistance and applied force. By carbon powder is meant here carbon particles having a size smaller than that corresponding to 50-80 mesh. When admixing carbon powder with the carbon grain, for instance in a proportion of 5–15% of the weight of the carbon grains, the body will become harder and consequently a larger force must be applied in order to achieve a given decrease in the resistance across the body. Such an embodiment is preferred in those instances when a harder body is desired or required.

Although various types of carbon can be used, graphite is preferred and then particularly highly pure graphite.

When a body is to be produced, a hardener is mixed into the mixture of silicone mass, silicone oil and carbon grains, this hardener being added in an amount adapted to the amount of silicone mass and silicone oil present.

Ome example is given below with reference to FIG. 7.

A mixture was prepared from 40 g silicone type Q3-3321 Dow Corning; 4 g hardener, 58 g graphite 20-28 mesh and 18 g silicone oil 200 centistokes.

The mixture was stirred and cast into cylindrical moulds having a diameter of 18 mm and a height of 8 mm, whereafter the mixture was allowed to harden.

Figure 7:
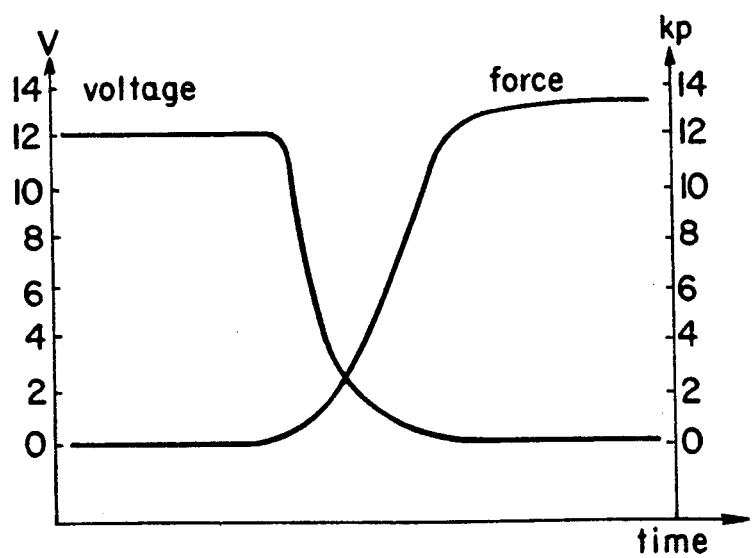
FIG. 7 illustrates an oscilloscope image showing the voltage drop across a potentiometer in relation to a force applied thereto.

Contact tabs or plates 7,8 corresponding to the tabs illustrated in FIGS. 1 and 2 were mounted on the body in the manner illustrated in FIGS. 7, 8.

The contact tabs or plates were made of brass.

FIG. 7 illustrates a diagram reproduced from an oscilloscope image. The left hand vertical axis shows the voltage drop (V) over the body at a load of about 30 W at 12 volts in relation to a force applied to the body, this force being shown on the right hand vertical axis kp.

As shown by the diagram, the voltage drops from 12 volts to 0 volt, when the applied force rises from 0 kp to a little more than 13 kp.

It could be established from a large number of repeated tests that deviations between different bodies manufactured in the same manner were very small. Furthermore, the bodies exhibited a uniform curve over the voltage drop relative to the force applied.

It can seen from FIG. 7 that the voltage drop is almost linear in the range from 10 to 4 volts. This corresponds to a force range of from 4 to 10 kp.

This approximative linear working range is important in a number of applications where linear control of a device is desired relative to a linear change in the force.

This linearity increases with increasing size of the carbon grains. Carbon powder gives rise to non-linear curves.

The present potentiometer can be used as a resistor of pressure sensor.

The inventive potentiometer can be used as a resistor for controlling electrical toys, or as limit switches, position indicators, etc. With respect to toys, experiments have shown that the pressure sensor can be used advantageously to control battery driven toys, such as battery driven cars. In this respect, the potentiometer is connected in series with the toy and batteries concerned.

The inventive potentiometer can also be used as a pressure sensor in a large number of application areas. One such application is found in weighing scales, where the pressure sensor is placed beneath the plate on which the goods to be weighed are placed. This plate will then transfer the force exerted by the goods to the pressure sensor. Another application is pressure sensors in conduits.

The potentiometer can also be used advantageously as a control device in servo mechanisms in hydraulic systems. The potentiometer can also be used particularly advantageously as a control device in transistors or thyristors for controlling electric motors and apparatus.

Another application is one of solely using the potentiometer as an on-off element, i.e. solely to detect the presence or absence of a presure, a mechanical force.

It will be understood that the inventive potentiometer has a large number of uses, of which the aforementioned are only a few.

It will also be understood that the body can be given any desired configuration suitable for the application concerned.

The configuration and orientation of the contact tabs or plates can also be varied.

The present invention shall not therefore be considered limited to the aforedescribed embodiments, since these embodiments can be modified within the scope of the following claims.

What is claimed and desired to be secured by Letters Patent is:

1. A pressure responsive potentiometer including an elastic body which comprises silicone mass mixed with a carbon fraction in such quantities that the electrical resistance across the body is changed in response to a force applied to the body, and which body has electrically conductive contact elements connected thereto in mutually spaced relationship, characterized in that the body is produced from a mixture comprising silicone mass, silicone oil and carbon grains in which the weight ratio of silicone mass to silicone oil is in the range of from about 1:0.3 to 1:0.5, and in which each of the carbon grains has a size which is in the size range which corresponds to the sieve size range which is from a 50 mesh sieve to a 10 mesh sieve.

2. A potentiometer according to claim 1, characterized in that the weight of the carbon grains is approximately equal to or greater than the weight of the silicone mass.

3. A potentiometer according to claim 1, characterized in that each of the carbon grains has a size which is smaller than a size corresponding to a 10 mesh sieve.

4. A potentiometer according to claim 1, characterized in that each of the carbon grains has a size corresponding to a size which ranges from a 28 mesh sieve to a 20 mesh sieve.

5. A potentiometer according to claim 1, characterized in that the body is constructed to a vertical height extension during manufacture of about 5 mm to 20 mm.

6. A potentiometer according to claim 1, characterized in that the silicone oil has a viscosity in the order of 200 centistokes.

7. A potentiometer according to claim 1, characterized in that the carbon grains are graphite grains.

8. A potentiometer according to claim 1, characterized in that carbon powder, the particles of which have a size smaller than a size corresponding to a 80 mesh to a 50 mesh sieve, is admixed prior to casting the body in an amount corresponding to about 5-15% of the weight of the carbon grains.

9. A potentiometer according to claim 1, wherein said carbon grains each have a size which is greater than a size corresponding to a 50 mesh screen.

10. A potentiometer according to claim 1, wherein said weight ratio of silicone mass to silicone oil is 1:0.4.

* * * * *